(12) United States Patent
Lambert et al.

(10) Patent No.: US 8,789,010 B2
(45) Date of Patent: Jul. 22, 2014

(54) MANAGING STATIC DATA STRUCTURES OF LEGACY SOFTWARE IN DYNAMIC CLASS LOADER ENVIRONMENTS

(75) Inventors: Mark Lambert, Menlo Park, CA (US); Laurent Domenech, San Jose, CA (US)

(73) Assignee: TIBCO Software Inc., Palo Alto, CA (US)

( * ) Notice: Subject to any disclaimer, the term of this patent is extended or adjusted under 35 U.S.C. 154(b) by 471 days.

(21) Appl. No.: 13/104,369

(22) Filed: May 10, 2011

(65) Prior Publication Data

US 2011/0307877 A1 Dec. 15, 2011

Related U.S. Application Data

(60) Provisional application No. 61/333,235, filed on May 10, 2010.

(51) Int. Cl.
*G06F 9/44* (2006.01)

(52) U.S. Cl.
CPC ........................................ *G06F 8/72* (2013.01)
USPC ........... 717/104; 717/105; 717/106; 717/107; 717/108

(58) Field of Classification Search
None
See application file for complete search history.

(56) References Cited

U.S. PATENT DOCUMENTS

| | | | |
|---|---|---|---|
| 7,546,605 B1* | 6/2009 | Kruger et al. .................. | 719/316 |
| 2004/0015936 A1 | 1/2004 | Susarla et al. | |
| 2006/0242625 A1 | 10/2006 | Fey | |
| 2006/0248140 A1 | 11/2006 | Birenheide | |
| 2007/0260633 A1* | 11/2007 | Rapicault et al. ......... | 707/103 R |

OTHER PUBLICATIONS

PCT/US11/35873, Search Report and Written Opinion of the International Searching Authority mailed Nov. 23, 2011.

* cited by examiner

*Primary Examiner* — Qamrun Nahar
(74) *Attorney, Agent, or Firm* — Baker & McKenzie LLP (57) ABSTRACT

A method for managing static data structures of a legacy data modeling software product in a dynamic class loader environment comprises constructing a bundle-specific registry for each software bundle in the dynamic class loader environment and instructing the legacy data modeling software product to use the bundle-specific registry rather than its default registry when creating in-memory representations of data model classes associated with a particular software bundle. Constructing a bundle-specific registry may include using the bundle's configuration metadata to calculate a dependency graph identifying the other bundles on which the software bundle depends. An initializer may construct the initial set of bundle-specific registries, and a listener may construct bundle-specific registries for new software bundles entering the system.

18 Claims, 5 Drawing Sheets

MANAGING STATIC DATA STRUCTURES OF LEGACY SOFTWARE IN DYNAMIC CLASS LOADER ENVIRONMENTS

CROSS REFERENCE TO RELATED APPLICATIONS

This application relates and claims priority to U.S. Provisional Patent Application No. 61/333,235 entitled, "Managing static data structures of legacy software in dynamic class loader environments with meta-data driven wiring," filed May 10, 2010, which is herein incorporated by reference.

TECHNICAL FIELD

This disclosure generally relates to a mechanism for facilitating interoperability between a legacy software package and a more sophisticated software environment and, more particularly, relates to managing static data structures of legacy software in dynamic class loader environments.

BACKGROUND

In computer science, "serialization" is the process of converting or translating an in-memory representation of a structured data model class (i.e., an "object") into a standard external form that can be persisted and can be identified using an external type identifier. This serialization process is sometimes referred to as "deflating an object" or "marshalling an object." The reverse process, extracting an in-memory representation of a data model class from a persisted standard external form identified by an external type identifier, is known as "deserialization," "inflating an object," or "unmarshalling an object."

Data modeling software products have been developed for use in serialization and deserialization procedures. Such data modeling software products typically use a data structure, such as a registry, that associates external type identifiers with data model classes that define the data model's in-memory representation. The data modeling software then uses the data structure to identify the data model whose classes are to be instantiated and configured.

One example of a legacy data modeling software product is the Java™ language-based Eclipse Modeling Framework (EMF). From an external model specification, EMF provides tools and runtime support to produce a set of Java classes for the model. The EMF library converts model instances from a variety of external forms, such as XML, into an in-memory form consisting of one or more Java objects. In at least some configurations, the EMF library uses a registry to perform the translation. The registry keys are external type identifiers, such as uniform resource identifiers (URIs), and the registry values are the Java classes that define the model's in-memory representation. The EMF software for deserializing XML documents into Java objects will get the XML document's external type identifier, look up the external type identifier in the registry to find the external type identifier's corresponding Java object, and then has the Java object read the external information and convert it into one or more in-memory model objects. In cases where there are multiple nested model objects from different models, the EMF deserialization software may perform multiple registry lookups as it parses the XML.

Many software packages with this sort of functionality assume that any software needing to deserialize can simply look up information in the registry and be able to instantiate the matching in-memory model classes. Such software may also assume that all classes required to instantiate a particular model object are available for use. In a simple Java URL class loader environment this is indeed the case, and EMF uses this mechanism. In a more sophisticated dynamic class loader environment, however, software may be segregated into different "bundles." Each bundle may be associated with configuration metadata describing, for example, the name of the bundle, the version of the bundle, and dependency information. Each bundle's metadata may then be used to calculate a dependency graph identifying a set of bundles upon which that bundle depends. This set of dependencies describes the classes that the bundle can instantiate, and limits the classes available to the bundle. In such a dynamic class loader environment, multiple versions of a particular bundle each have a separate existence and are capable of simultaneous use by other versions of other bundles in other dependency graphs. Such an environment may be described as having metadata-driven wiring.

One example of a more sophisticated dynamic class loader environment with metadata driven wiring is the OSGi Framework. The OSGi Framework is a class loader environment based on top of Java but, rather than supporting a single class path containing all classes, OSGi supports multiple bundle-specific class paths. The single registry approach of EMF may not work with OSGi's more sophisticated class loader environment. An EMF registry contains all possible external type identifiers and their corresponding model classes, of which there can only be one version per model. An OSGi software bundle trying to read a particular external model format would not be able to instantiate the corresponding in-memory representation if it did not have access to the requisite classes, even if those classes are in the single registry. If there are multiple versions of a particular bundle containing model classes, only one version is able to exist in the registry at a time, even if multiple versions of the bundle are present and available for use in the OSGi environment.

SUMMARY

Disclosed herein are various embodiments of a system and method for managing static data structures of a legacy data modeling software product, such as EMF, in a dynamic class loader environment, such as OSGi. The dynamic class loader environment may comprise a variable plurality of software bundles, and may include multiple versions of a software bundle. The legacy data modeling software product may use a registry associating external type identifiers with a data model class to create an in-memory representation of the data model class. Embodiments of the method may include constructing bundle-specific registries for the software bundles for use by the legacy data modeling software product.

In some embodiments, the data model class may comprise a Java class, and the in-memory representation may comprise a Java object. The external type identifiers may be specified using XML. Bundle-specific registries may be specified through a Java system property.

In some embodiments, an initializer may construct a bundle-specific registry for each software bundle in the dynamic class loader environment. A listener may construct a bundle-specific registry for new bundles entering the dynamic class loader environment. The bundle-specific registries may be managed in a super-registry. The super-registry may replace the registry used by the legacy data modeling software product and may provide the correct bundle-specific registry to the legacy data modeling software product.

Embodiments of bundle-specific registry construction may include calculating a dependency graph using configuration

DETAILED DESCRIPTION

Figure 1:
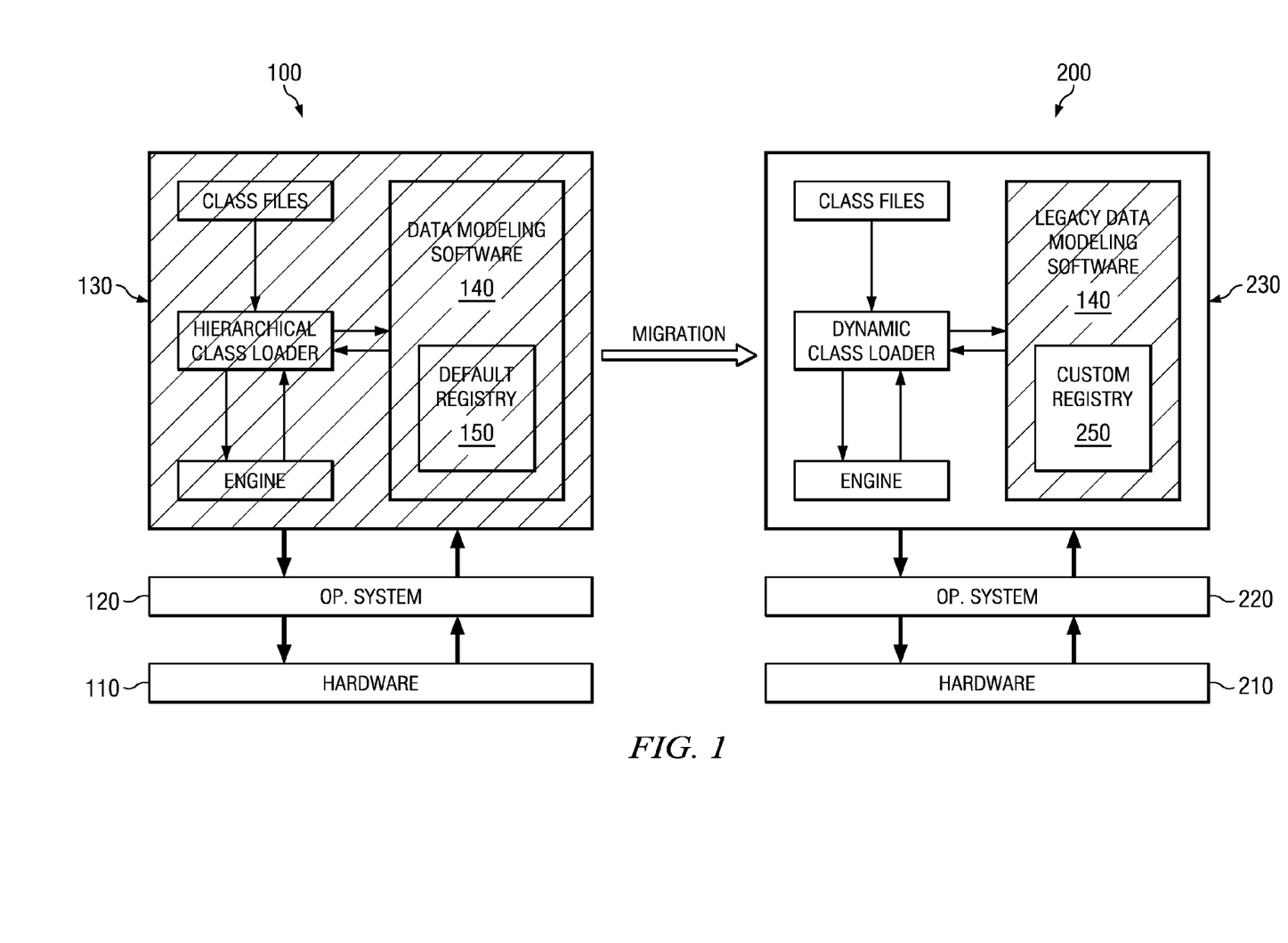
FIG. 1 is a schematic diagram illustrating a dynamic class loader environment using a legacy data modeling software product, in accordance with the present disclosure.

As illustrated in FIG. 1, example legacy system 100 comprises hardware 110, operating system 120, and execution environment 130. Execution environment 130 may be any execution environment utilizing a hierarchical class loader system. Hardware 110 may be any combination of processors, memory, storage, networking devices, routers, cabling, transmitters, receivers, input/output devices, machines, mechanical devices, electronic devices, and other physical resources capable of implementing legacy system 100. Operating system 120 may be any combination of executable program code, data, and other software or firmware capable of implementing legacy system 100 in conjunction with hardware 110.

An example embodiment of execution environment 130 in legacy system 100 is a basic Java environment utilizing a linear parent-child hierarchical class loader system. In a basic Java environment, if a child specifies a version of Class A, but a parent in the child's hierarchy specifies a different version of Class A, the child will load the different version of Class A at runtime regardless of the child's specification. Another example embodiment of execution environment 130 in legacy system 100 is a J2EE environment utilizing a tree hierarchical class loader system. In a J2EE environment, if a child specifies a version of Class A, this version of Class A will be loaded at runtime even if the child's sibling (or lower entity) specifies a different version of Class A. However, if a parent in the child's hierarchy specifies a different version of Class A, the child will still load the different version of Class A at runtime regardless of the child's specification. So although J2EE supports same-level class isolation, the parent-child class conflict still exists.

Data modeling software products 140 have been developed for use in serialization and deserialization procedures performed by class loaders in example execution environment 130. Such data modeling software products 140 typically use a data structure, such as default registry 150, that associates external type identifiers with data model classes that define the data model's in-memory representation. The data modeling software 140 uses default registry 150 to identify the data model whose classes are to be instantiated and configured.

FIG. 1 also shows the migration from example legacy system 100 to example system 200. System 200 comprises hardware 210, operating system 220, and execution environment 230. Execution environment 230 is more sophisticated than execution environment 130, and may be any execution environment utilizing a dynamic class loader system in which explicit dependencies can be defined, rather than the hierarchical class loader system of execution environment 130. Hardware 210 may be any combination of processors, memory, storage, networking devices, routers, cabling, transmitters, receivers, input/output devices, machines, mechanical devices, electronic devices, and other physical resources capable of implementing system 200, and may be similar or even identical to hardware 110. Operating system 220 may be any combination of executable program code, data, and other software or firmware capable of implementing system 200 in conjunction with hardware 210, and may be similar or even identical to operating system 100.

An example embodiment of execution environment 230 in system 200 is a dynamic class loader environment utilizing a graphical, non-hierarchical class loader system, such as OSGi. In an OSGi environment, software may be segregated into different "bundles." Each bundle may be associated with configuration metadata describing, for example, the name of the bundle, the version of the bundle, and class dependency information. Each bundle's metadata may then be used to calculate a dependency graph identifying a set of bundles upon which that bundle depends. This set of dependencies describes the classes that the bundle can instantiate, and limits the classes available to the bundle. In such a dynamic class loader environment, multiple versions of a particular bundle each have a separate existence and are capable of simultaneous use by other versions of other bundles in other dependency graphs. The OSGi Framework is a class loader environment based on top of Java but, rather than supporting a single class path containing all classes, OSGi supports multiple bundle-specific class paths.

The single default registry 150 approach of legacy data modeling software 140 may not work with more sophisticated environments 230. Such a single registry 150 may contain all possible external type identifiers and their corresponding model classes, of which there can only be one version per model. A software bundle trying to read a particular external model format would not be able to instantiate the corresponding in-memory representation if it did not have access to the requisite classes, even if those classes are in the single registry 150. If there are multiple versions of a particular bundle containing model classes, only one version is able to exist in the registry 150 at a time, even if multiple versions of the bundle are present and available for use in the dynamic class loader environment 230.

Legacy data modeling software products 140 developed for use by class loaders in less sophisticated execution environments 130 can be configured for use by class loaders in dynamic class loader environments 230 through custom registry 250. In an embodiment illustrated in FIG. 2, the software in dynamic class loader environment 230 is segregated into bundles: Bundle A, Bundle B, Bundle B.2, Bundle C, and so on through Bundle X. Each software bundle can be associated with its own bundle-specific registry 250A-X representing the set of external formats whose internal format classes are available to it based on its dependency graph. Together, these bundle-specific registries 250A-X form a super-registry 250. The super-registry can be described as a registry-of-registries. Each bundle-specific registry's keys are the external type identifiers associated with that bundle, and the bundle-specific registry's values are the data model classes associated with the keys. These data model classes define the data model's in-memory representation. Using this multiple-registry approach, a given software bundle knows only how to deserialize model objects whose classes it can access. If there are multiple versions of a particular bundle, such as Bundle B and Bundle B.2, each bundle has its own registry (250B and 250B.2 respectively), its own dependencies, and its own versions of any in-memory model classes.

An embodiment of a system using a legacy data modeling software product 140 in a dynamic class loader environment 230 as shown in FIG. 1 is using the Eclipse Modeling Framework (EMF) in an OSGi environment. Both EMF and OSGi run in a Java environment. EMF is a framework for defining and managing data models. One of the capabilities EMF provides is the reading of persisted data models into an in-memory format consisting of one or more Java objects. As discussed above, this process is known as deserialization.

The persisted data models may be stored in a variety of forms, for example XML Metadata Interchange (XMI). An XMI file contains model type information in the form of an XML namespace QName. In other words, the QName uniquely identifies the data model whose instances have been persisted in the XMI file.

The data describing how to convert the XMI into an in-memory representation is contained in various Java objects that together comprise an EMF package. EMF supports deserialization by providing a package registry that maps data model QNames to the Java class names of corresponding EMF package objects.

In a traditional "flat" class path environment, there is typically a single EMF package registry. This single registry is responsible for mapping the QNames known to EMF into their corresponding EMF package objects. This mapping presents at least two problems. First, it permits a single version of the EMF model to be used in an EMF installation. If you want multiple versions of an EMF model package, different QNames and different Java class names may be used, effectively making them different models, rather than different versions of the same model. This means that software using a new version of the model in this scheme should be rewritten when a new version comes out. Second, all software in the flat class path environment shares all models. Thus, the environment may not be structured such that it can support multiple applications running in it, where one application can use a set of models, and a second application could use a different set of models that happen to have the same XMI QName or EMF package Java class name.

In an OSGi environment, the class loading architecture is much more sophisticated. As described above, it defines "bundles" of software that have their own dependencies, and of which multiple versions can exist. In this environment, it is much easier to support multiple applications, each using either different versions of the same data models, or entirely different models that happen to have the same XMI QNames or Java package names. The environment is very dynamic: bundles can be added to the system at any time and can be removed at any time. Rather than rewriting EMF to work in an OSGi environment, which would mean not only changes to EMF itself, but also changes to applications that use EMF, in this embodiment, EMF is configured to use a custom OSGi-optimized serialization registry rather than the EMF default static registry. This registry override is accomplished through use of a mechanism provided by EMF that allows specification of alternate registry implementations through a Java system property. Consequently, this embodiment allows EMF and its applications to remain substantially unchanged, while taking advantage of OSGi's class loading sophistication.

As shown in FIG. 1 and discussed above, legacy data modeling software products 140 developed for use by class loaders in less sophisticated execution environments 130 can be configured for use by class loaders in dynamic class loader environments 230 by managing one or more static data structures of the legacy data modeling software. In an embodiment, a system and method for managing such static data structures (such as a registry) may include, but are not limited to, a custom registry 250, an initializer, and a listener.

Custom Registry

Figure 2:
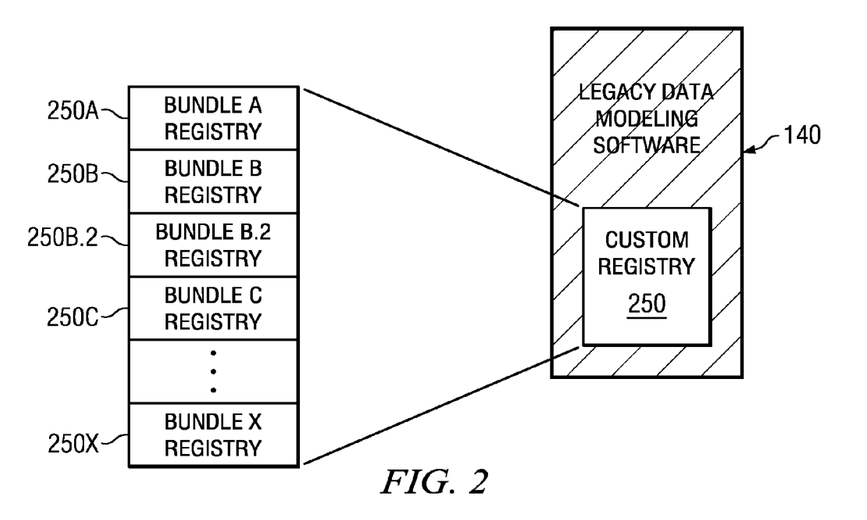
FIG. 2 is a schematic diagram illustrating an embodiment of a custom package registry implementation, in accordance with the present disclosure.

FIG. 2 illustrates a custom registry 250 implementation in a legacy data modeling software product 140. In an embodiment, custom registry 250 may be the Eclipse Modeling Framework (EMF) package registry. The standard EMF software permits its users to install a custom package registry implementation that overrides the default registry implementation. In such an embodiment, the default registry implementation 150 is replaced by a custom registry 250 more suited to dynamic class loader environment 230 (see FIG. 1). This custom registry implementation 250 appears to EMF like a single registry but, in actuality, it is a collection of registries: one registry 250A through 250X for each software bundle A through X. This collection of registries can be described as a super-registry.

Each software bundle A through X has its own graph of dependent bundles comprising the software needed by that bundle. Each software bundle has its own registry, containing those versions of those models available in that software bundle's dependency graph. The custom registry implementation may automatically determine which software bundle is attempting to use EMF, find that software bundle's corresponding registry, and make it visible to EMF. When another software bundle uses EMF, then a similar procedure happens using that software bundle's registry. Thus, EMF believes it is using a single registry, the software using EMF uses it in a conventional way, and the dynamic class loader environment's sophisticated capabilities may be leveraged without requiring any substantial changes to either the EMF implementation or the implementations of the software using EMF.

Initializer

In an embodiment, a system for managing static data structures of a legacy data modeling software product in a dynamic class loader environment may use an initializer responsible for initializing the multiple-registry system at start-up. In an embodiment where the dynamic class loader environment is OSGi, the initializer may be an activator. The OSGi system allows each bundle to have an activator, which is a piece of software that runs whenever the bundle is started or stopped. In an embodiment, the system for managing static data structures of a legacy data modeling software product with OSGi is itself implemented as an OSGi bundle. This bundle's activator is responsible for initializing the multiple-registry system when the bundle is started, and removing it when the bundle is stopped.

Figure 3:
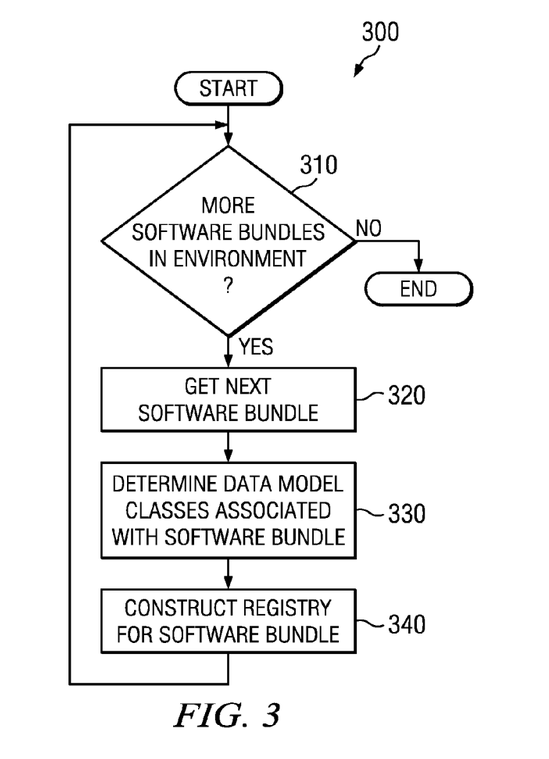
FIG. 3 is a flow diagram illustrating an embodiment of an initialization process, in accordance with the present disclosure.

FIG. 3 is a flow diagram 300 illustrating an example process for initializing the multiple-registry system. The initializer looks at all bundles currently available in the dynamic class loader environment. At step 310, if unexamined software bundles remain in the environment, the initializer gets 320 the next software bundle for examination. The initializer then determines 330 the data model classes associated with that software bundle, and then constructs 340 a registry for that software bundle. The initializer may use metadata associated with the software bundle to determine the bundle's associated data model classes. The constructed registry's keys may be the set of external type identifiers associated with the data model classes determined in step 330. The registry values may be data model classes. After constructing 340 the registry, the initializer returns to step 310. If unexamined software bundles remain in the environment, the process is repeated. If at step 310 no unexamined software bundles remain in the environment, the initialization process ends.

Figure 4:
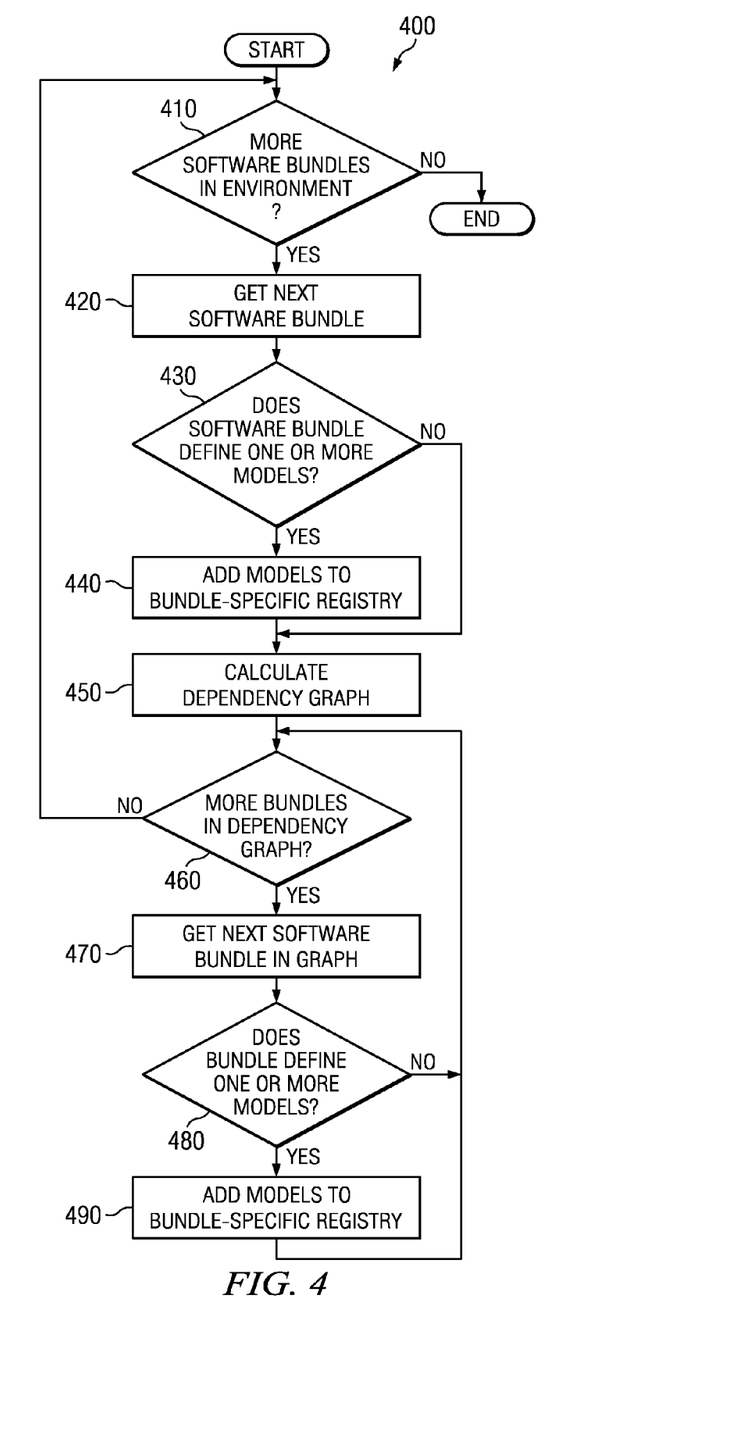
FIG. 4 is a flow diagram illustrating an embodiment of an initialization process, in accordance with the present disclosure.

FIG. 4 is a flow diagram 400 illustrating another example process for initializing the multiple-registry system. The initializer looks at all bundles currently available in the dynamic class loader environment. At step 410, if unexamined software bundles remain in the environment, the initializer gets 420 the next software bundle for examination. The initializer then determines at step 430 whether this software bundle defines one or more data model classes. If it does, then those model classes are added 440 to a bundle-specific registry for that bundle. The registry's keys may be the set of external type identifiers associated with the data model classes and the registry's values may be data model classes.

After processing any data model classes defined by the bundle, the initializer calculates 450 a dependency graph identifying all other bundles on which this bundle has direct or indirect dependencies, creating a dependency subset of software bundles. At step 460, if unexamined software bundles remain in the dependency subset, the initializer gets 470 the next subset member for examination. The initializer then determines at step 480 whether this subset member defines one or more data model classes. If it does, then those model classes are added 490 to the bundle-specific registry for the software bundle. Returning to step 460, if unexamined software bundles remain in the dependency subset, the next member of the subset is processed. When all dependency subset members have been processed, that bundle's registry is complete. Returning to then to step 410, if unexamined software bundles remain in the environment, the entire process is repeated for all remaining software bundles. If, at step 410, no unexamined software bundles remain in the environment, the initialization process ends.

Figure 5:
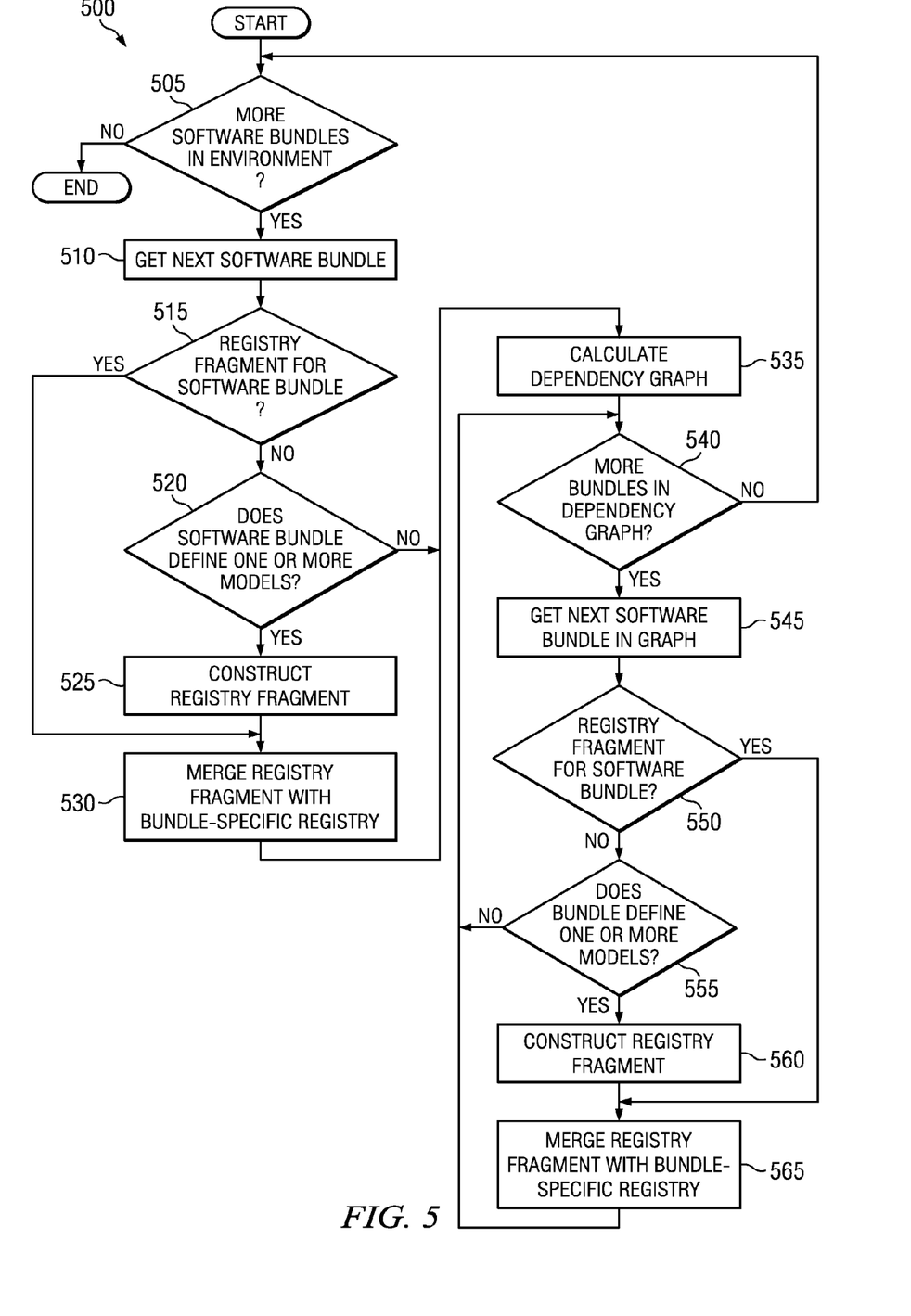
FIG. 5 is a flow diagram illustrating an embodiment of an initialization process, in accordance with the present disclosure.

FIG. 5 is a flow diagram 500 illustrating another example process for initializing the multiple-registry system. The initializer looks at all bundles currently available in the dynamic class loader environment. At step 505, if unexamined software bundles remain in the environment, the initializer gets 510 the next software bundle for examination. The initializer then determines at step 515 whether a registry fragment has previously been constructed for this software bundle. Such a registry fragment may contain, for example, only that bundle's serialization mappings. At step 515, if no registry fragment is available, the initializer determines at step 520 whether this software bundle defines one or more data model classes. If it does, then a registry fragment is constructed 525 and the model classes in the constructed fragment are merged 530 with the bundle-specific registry for that bundle. But if, at step 515, a registry fragment is available for the software bundle, then that fragment is merged 530 with the bundle-specific registry, thus eliminating redundant registry computations.

After processing or constructing the bundle's registry fragment, the initializer calculates 535 a dependency graph identifying all other bundles on which this bundle has direct or indirect dependencies, creating a dependency subset of software bundles. At step 540, if unexamined software bundles remain in the dependency subset, the initializer gets 545 the next subset member for examination. The initializer then determines at step 550 whether a registry fragment has previously been constructed for this subset member. At step 550, if no registry fragment is available, the initializer determines at step 555 whether this subset member defines one or more data model classes. If it does, then a registry fragment is constructed 560 and the model classes in the constructed fragment are merged 565 with the bundle-specific registry for that bundle. But if, at step 550, a registry fragment is available for the subset member, then that existing fragment is merged 565 with the bundle-specific registry. Returning to step 540, if unexamined software bundles remain in the dependency subset, the next member of the subset is processed. When all dependency subset members have been processed, that bundle's registry is complete. Returning to then to step 505, if unexamined software bundles remain in the environment, the entire process is repeated for all remaining software bundles. If, at step 505, no unexamined software bundles remain in the environment, the initialization process ends.

Although embodiments of an initialization process for a system for managing static data structures of a legacy data modeling software product in a dynamic class loader environment are shown in FIG. 3, FIG. 4, and FIG. 5, other embodiments are contemplated that may use additional steps, fewer steps, different steps, or a combination of steps from those described in the figures.

As previously discussed, in some embodiments the dynamic class loader environment is OSGi, and the initializer may be a bundle activator. In such embodiments the legacy data modeling software may be EMF, and each software bundle in the OSGi environment may define one or more EMF models, whose data may be placed in a custom EMF package registry. For a given bundle X, the bundle activator uses that bundle X's OSGi configuration metadata to calculate a dependency graph of all bundles on which X has direct or indirect dependencies. For each of the bundles in the resulting dependency graph, the activator may find all of the EMF models belonging to a given dependency graph member and place them in a registry associated with bundle X. The result is a registry which contains a subset of all the models in the entire OSGi environment, and visible to bundle X.

Thus, in such an embodiment, each bundle has its own EMF package registry. All of these registries are themselves maintained by an OSGi bundle in the custom package registry (the super-registry). When software in bundle X uses EMF, or when system software uses EMF on behalf of a bundle X, bundle X's registry is automatically made available to EMF as its single package registry. Since each bundle has its own registry, the contents of that registry may vary by bundle, with different bundles having different versions of the same EMF models, or entirely different EMF models that happen to have the same QNames and/or EMF package Java class names.

OSGi Bundle Listener

Figure 6:
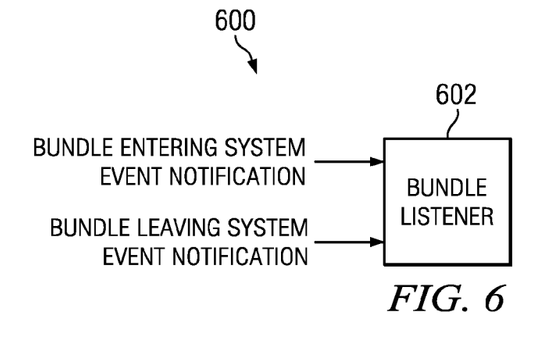
FIG. 6 is a schematic diagram illustrating an embodiment of a bundle listener, in accordance with the present disclosure.

In some embodiments of a system for managing static data structures of a legacy data modeling software product in a dynamic class loader environment, software bundles may enter or leave the environment at any time. In such embodiments a listener may monitor such bundle arrivals and departures, and may perform registry maintenance in response. FIG. 6 is a schematic diagram 600 illustrating a bundle listener 602. In the illustrated embodiment, listener 602 receives an event whenever a bundle enters or leaves the dynamic class loader environment. Other methods of monitoring are also contemplated; for example, the listener may poll for new bundle arrivals or departures. In an embodiment where the dynamic class loader environment is OSGi, the registry may be automatically maintained using standard OSGi bundle listener functionality. An OSGi implementation of the legacy data modeling software registry may create its own bundle listener, which receives events whenever a bundle is added to or removed from the OSGi framework. When a bundle is added, the listener may fetch all serialization bindings from that bundle and put them in a special registry for that bundle. It may further create a bundle dependency graph rooted at the incoming bundle, fetch all of their serialization bindings as well, and place them into the new bundle's registry.

Figure 7A:
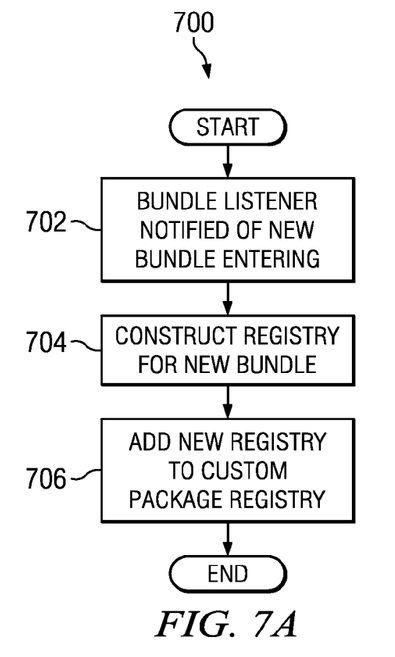
FIGS. 7A and 7B are flow diagrams illustrating an example process for a new bundle entering a system and an example process for a bundle leaving a system, in accordance with the present disclosure.
Figure 7B:
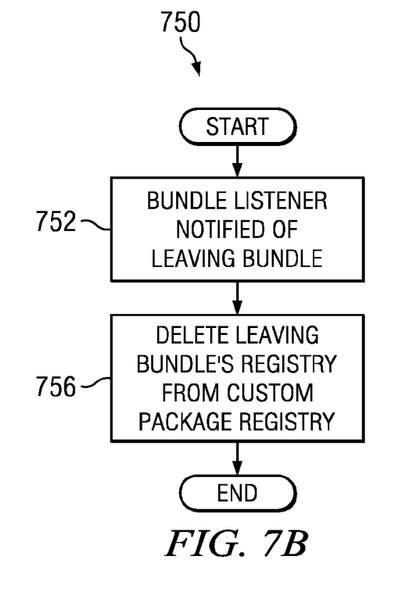

FIG. 7A is a schematic diagram 700 illustrating a process for a bundle entering the system. The bundle listener may be notified 702 that a new bundle has entered the system, may construct 704 a registry for that bundle, and may add 706 the registry to the custom package registry (the super-registry). When the bundle begins to use the legacy data modeling software, or when other software uses the legacy data modeling software on behalf of the bundle, the bundle's registry is made available for use. FIG. 7B is a flow diagram 750 illustrating a process for a bundle leaving the system. Whenever a bundle leaves the system, the bundle listener is notified 752, and it removes 756 that bundle's registry from the registry-of-registries (the super-registry) since it will no longer be used.

In an embodiment, the bundle listener may construct a registry fragment for each bundle entering the system containing only that bundle's serialization mappings. Whenever a bundle is added, the listener may then create a dependency graph and merge all the graph members' fragments into a registry used by the new bundle. Because there may be a lot of overlap between dependencies of various bundles, registry information may be computed once, and then incorporated as needed into a given bundle's serialization registry. In some embodiments, the bundle listener may perform bundle processing for new bundles as described above and as shown in FIG. 3, FIG. 4, and FIG. 5. Other embodiments are contemplated that may use additional steps, fewer steps, different steps, or a combination of steps from those described in the separate figures.

Although this disclosure discusses in depth specific embodiments using EMF in an OSGi environment, one having skill in the art would understand that the techniques and methods disclosed herein may be applied generally to managing static data structures of other legacy software packages in other dynamic class loader environments with meta-data driven wiring. Furthermore, while various embodiments in accordance with the disclosed principles have been described above, it should be understood that they have been presented by way of example only, and are not limiting. Thus, the breadth and scope of the invention(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for managing static data structures of a legacy data modeling software product in a dynamic class loader environment, wherein the dynamic class loader environment comprises a variable plurality of software bundles, and wherein the legacy data modeling software product is operable to use a registry associating external type identifiers with at least one data model class to create an in-memory representation of the at least one data model class, the method comprising:

for a first of the plurality of software bundles, constructing a bundle-specific registry, wherein the bundle-specific registry comprises a set of external type identifiers associated with the first software bundle, and wherein the bundle-specific registry associates each member of the set of external type identifiers with at least one data model class; and instructing the legacy data modeling software product to use the constructed bundle-specific registry when creating the in-memory representation of the at least one data model class represented by a member of the set of external type identifiers associated with the first software bundle, wherein the plurality of software bundles may comprise different versions of a specific software bundle.

2. The method of claim 1, wherein the plurality of software bundles comprises a specific software bundle and an alternate version of the specific software bundle.

3. The method of claim 1, wherein the dynamic class loader environment comprises OSGi.

4. The method of claim 1, wherein the legacy data modeling software product comprises EMF (Eclipse Modeling Framework), wherein the at least one data model class comprises a Java class, and wherein the in-memory representation of the at least one data model class comprises a Java object.

5. The method of claim 4, wherein the external type identifiers are specified using XML (Extensible Markup Language).

6. The method of claim 4, wherein instructing the legacy data modeling software product to use the constructed bundle-specific registry when creating the in-memory representation of the at least one data model class represented by a member of the set of external type identifiers associated with the first software bundle comprises specifying the bundle-specific registry through a Java system property.

7. The method of claim 1, further comprising constructing a bundle-specific registry for each of the remaining plurality of software bundles in the dynamic class loader environment.

8. The method of claim 7, further comprising:
receiving a notification that a new software bundle has entered the dynamic class loader environment; and
constructing a new bundle-specific registry for the new software bundle.

9. The method of claim 1, wherein the first software bundle is associated with configuration metadata, and wherein constructing the bundle-specific registry for the first software bundle comprises:
   calculating a dependency graph for the first software bundle using the configuration metadata, wherein the dependency graph identifies a dependency subset of the plurality of software bundles, and wherein the dependency subset comprises at least the first software bundle;
   for each member of the dependency subset, constructing a member-specific registry fragment comprising a set of external type identifiers defined by the member of the dependency subset, wherein the member-specific registry fragment associates each member of the set of external type identifiers with at least one data model class; and
   merging the registry fragments of each member of the dependency subset into a single registry, wherein the single registry is the bundle-specific registry for the first software bundle.

10. The method of claim 9, wherein a second of the plurality of software bundles is associated with second configuration metadata, the method further comprising:
   calculating a second dependency graph for the second software bundle using the second configuration metadata, wherein the second dependency graph identifies a second dependency subset of the plurality of software bundles, and wherein the second dependency subset comprises at least the second software bundle and a member of the first dependency subset;
   for each member of the second dependency subset not a member of the first dependency subset, constructing a member-specific registry fragment comprising a set of external type identifiers defined by the member of the second dependency subset, wherein the member-specific registry fragment associates each member of the set of external type identifiers with at least one data model class; and
   merging the registry fragments of each member of the second dependency subset into a second single registry, wherein the second single registry is the bundle-specific registry for the second software bundle.

11. The method of claim 10, wherein the second software bundle is a member of the first dependency subset.

12. A system for managing static data structures of a legacy data modeling software product in a dynamic class loader environment, wherein the dynamic class loader environment comprises a variable plurality of software bundles, and wherein the legacy data modeling software product is configured to use a registry associating external type identifiers with at least one data model class to create an in-memory representation of the at least one data model class, the system comprising:
   a hardware layer adapted for running an operating system that executes an execution system, the hardware layer comprising a processor in communication with a memory; and
   the execution system comprising:
      an initializer operable to identify an initial set of software bundles in the dynamic class loader environment, wherein the initial set of software bundles may comprise different versions of a specific software bundle;
      at least one bundle-specific registry constructed by the initializer, wherein a bundle-specific registry is constructed for each member of the initial set of software bundles, and wherein each bundle-specific registry associates at least one external type identifier with at least one data model class;
      a super-registry managing the at least one bundle-specific registry, wherein the super-registry replaces a default registry of the legacy data modeling software product, and wherein the super-registry provides the legacy data modeling software product with a constructed first bundle-specific registry corresponding to a first software bundle for use in creating the in-memory representation of the at least one data model class represented by an external type identifier associated with the first software bundle; and
      a listener configured to receive a notification that a new software bundle has entered the dynamic class loader environment, and further configured to construct a bundle-specific registry for the new software bundle upon receiving the notification.

13. The system of claim 12, wherein the plurality of software bundles comprises a specific software bundle and an alternate version of the specific software bundle.

14. The system of claim 12, wherein the dynamic class loader environment comprises OSGi.

15. The system of claim 12, wherein the legacy data modeling software product comprises EMF (Eclipse Modeling Framework), wherein the at least one data model class comprises a Java class, and wherein the in-memory representation of the at least one data model class comprises a Java object.

16. The system of claim 15, wherein the external type identifiers are specified using XML (Extensible Markup Language).

17. The system of claim 15, wherein replacing the default registry of the legacy data modeling software product with the super-registry comprises specifying the super-registry through a Java system property.

18. The system of claim 12, wherein each member of the initial set of software bundles is associated with configuration metadata, and wherein constructing the bundle-specific registry for each set member comprises:
   calculating a dependency graph for the set member using the set member's associated configuration metadata, wherein the dependency graph identifies the set member's dependency subset of the plurality of software bundles;
   for each member of the dependency subset, constructing a subset-member-specific registry fragment comprising a set of external type identifiers defined by the subset member, wherein the subset-member-specific registry fragment associates each member of the set of external type identifiers with at least one data model class; and
   merging the registry fragments of each subset member into a single registry, wherein the single registry is the bundle-specific registry for the set member.

* * * * *